(12) United States Patent
Yoon et al.

(10) Patent No.: US 11,990,279 B2
(45) Date of Patent: May 21, 2024

(54) CAPACITOR COMPONENT AND PASTE FOR EXTERNAL ELECTRODE

(71) Applicant: SAMSUNG ELECTRO-MECHANICS CO., LTD., Suwon-si (KR)

(72) Inventors: Dae Woo Yoon, Suwon-si (KR); Su Jin Lee, Suwon-si (KR); Da Mi Kim, Suwon-si (KR); Bum Suk Kang, Suwon-si (KR); Seong Han Park, Suwon-si (KR); Jeong Ryeol Kim, Suwon-si (KR)

(73) Assignee: SAMSUNG ELECTRO-MECHANICS CO., LTD., Suwon-si (KR)

( * ) Notice: Subject to any disclaimer, the term of this patent is extended or adjusted under 35 U.S.C. 154(b) by 239 days.

(21) Appl. No.: 17/702,223

(22) Filed: Mar. 23, 2022

(65) Prior Publication Data
US 2023/0133669 A1 May 4, 2023

(30) Foreign Application Priority Data
Oct. 29, 2021 (KR) .................. 10-2021-0146876

(51) Int. Cl.
*H01G 4/008* (2006.01)
*C03C 3/066* (2006.01)
*C03C 3/093* (2006.01)
*C03C 4/14* (2006.01)
*C03C 8/04* (2006.01)
*C03C 8/18* (2006.01)
*H01G 4/248* (2006.01)
*H01G 4/30* (2006.01)

(52) U.S. Cl.
CPC ............. *H01G 4/008* (2013.01); *C03C 3/066* (2013.01); *C03C 3/093* (2013.01); *C03C 4/14* (2013.01); *C03C 8/04* (2013.01); *C03C 8/18* (2013.01); *H01G 4/248* (2013.01); *C03C 2204/00* (2013.01); *H01G 4/30* (2013.01)

(58) Field of Classification Search
CPC .......... C03C 3/066; C03C 3/093; C03C 4/14; C03C 8/04; C03C 8/18; C03C 2204/00; H01G 4/008; H01G 4/2325; H01G 4/248; H01G 4/30
See application file for complete search history.

(56) References Cited

U.S. PATENT DOCUMENTS

| 10,446,321 | B2 | 10/2019 | Noda et al. |
| 2011/0183138 | A1 | 7/2011 | Trommer et al. |
| 2021/0175016 | A1 | 6/2021 | Yun et al. |

FOREIGN PATENT DOCUMENTS

| JP | 2011-528651 A | 11/2011 |
| KR | 10-2021-0071496 A | 6/2021 |

OTHER PUBLICATIONS

A.R. Hanifi et al., "Independent but Additive Effects of Fluorine and Nitrogen Substitution on Properties of a Calcium Aluminosilicate Glass", J. Am. Ceram. Soc., 95 (2012), 600-606.

*Primary Examiner* — Nathan Milakovich
(74) *Attorney, Agent, or Firm* — MORGAN, LEWIS & BOCKIUS LLP

(57) ABSTRACT

A capacitor component includes a body, including a dielectric layer and an internal electrode layer, and an external electrode disposed on one surface of the body. The external electrode includes a conductive base and a glass disposed in the conductive base, and the glass includes 0.01 wt % or more to 5.8 wt % or less of nitrogen (N) based on a total weight of the glass.

20 Claims, 3 Drawing Sheets

CAPACITOR COMPONENT AND PASTE FOR EXTERNAL ELECTRODE

CROSS-REFERENCE TO RELATED APPLICATION(S)

The present application claims the benefit of priority to Korean Patent Application No. 10-2021-0146876, filed on Oct. 29, 2021 in the Korean Intellectual Property Office, the entire disclosure of which is incorporated herein by reference.

TECHNICAL FIELD

The present disclosure relates to a capacitor component and a paste for an external electrode.

BACKGROUND

A multilayer ceramic capacitor (MLCC) is an important chip component used in industrial fields such as communications, computing, home appliances, automobile manufacturing, and the like, due to advantages thereof, such as compactness, high capacitance, and ease of mounting. In detail, an MLCC is a core passive component used in electric, electronic, and information communications devices such as mobile phones, computers, digital TVs, and the like.

Recently, multilayer ceramic capacitors (MLCCs) are also trending toward miniaturization and high capacitance according to miniaturization and high performance of electronic devices, and the importance of securing high reliability of capacitor components is increasing with such a trend. However, a side effect of reducing hermeticity of the external electrode occurs when a thinning process is performed through an existing external electrode material. Accordingly, there is a need to develop a material for implementing improved reliability of an external electrode.

SUMMARY

An aspect of the present disclosure is to provide a capacitor component which may improve moisture resistance characteristics through glass matrix reinforcement of an external electrode.

According to an aspect of the present disclosure, a capacitor component includes a body, including a dielectric layer and an internal electrode layer, and an external electrode disposed on one surface of the body. The external electrode includes a conductive base and a glass disposed in the conductive base, and the glass includes 0.01 wt % or more to 5.8 wt % or less of nitrogen (N) based on a total weight of the glass.

BRIEF DESCRIPTION OF DRAWINGS

The above and other aspects, features, and advantages of the present disclosure will be more clearly understood from the following detailed description, taken in conjunction with the accompanying drawings.

DETAILED DESCRIPTION

Figure 1:
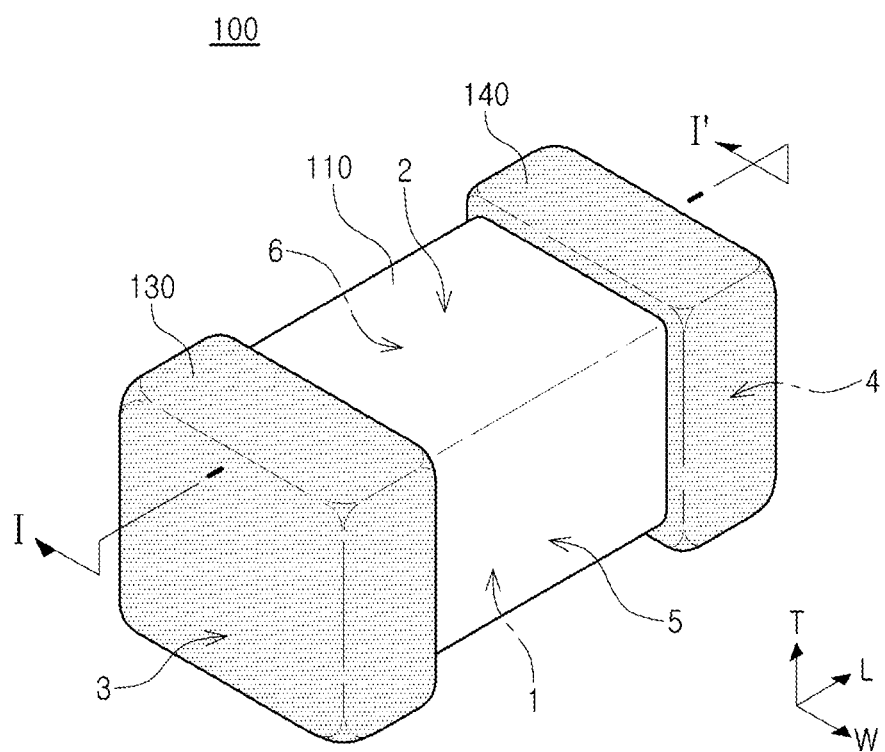
FIG. 1 is a schematic perspective view of a capacitor component according to an exemplary embodiment of the present disclosure.

Hereinafter, embodiments of the present disclosure will be described as follows with reference to the attached drawings.

The present disclosure may, however, be exemplified in many different forms and should not be construed as being limited to the specific embodiments set forth herein. Rather, these embodiments are provided so that this disclosure will be thorough and complete, and will fully convey the scope of the disclosure to those skilled in the art.

Throughout the specification, it will be understood that when an element, such as a layer, region or wafer (substrate), is referred to as being "on," "connected to," or "coupled to" another element, it can be directly "on," "connected to," or "coupled to" the other element or other elements intervening therebetween may be present. In contrast, when an element is referred to as being "directly on," "directly connected to," or "directly coupled to" another element, there may be no elements or layers intervening therebetween. Like numerals refer to like elements throughout. As used herein, the term "and/or" includes any and all combinations of one or more of the associated listed items.

It will be apparent that though the terms first, second, third, etc. may be used herein to describe various members, components, regions, layers and/or sections, these members, components, regions, layers and/or sections should not be limited by these terms. These terms are only used to distinguish one member, component, region, layer or section from another region, layer or section. Thus, a first member, component, region, layer or section discussed below could be termed a second member, component, region, layer or section without departing from the teachings of the exemplary embodiments.

Spatially relative terms, such as "above," "upper," "below," and "lower" and the like, may be used herein for ease of description to describe one element's relationship to another element(s) as shown in the figures. It will be understood that the spatially relative terms are intended to encompass different orientations of the device in use or operation in addition to the orientation depicted in the figures. For example, if the device in the figures is turned over, elements described as "above," or "upper" other elements would then be oriented "below," or "lower" the other elements or features. Thus, the term "above" can encompass both the above and below orientations depending on a particular direction of the figures. The device may be otherwise oriented (rotated 90 degrees or at other orientations) and the spatially relative descriptors used herein may be interpreted accordingly.

The terminology used herein describes particular embodiments only, and the present disclosure is not limited thereby. As used herein, the singular forms "a," "an," and "the" are intended to include the plural forms as well, unless the context clearly indicates otherwise. It will be further understood that the terms "comprises," and/or "comprising" when used in this specification, specify the presence of stated features, integers, steps, operations, members, elements, and/or groups thereof, but do not preclude the presence or addition of one or more other features, integers, steps, operations, members, elements, and/or groups thereof.

Hereinafter, embodiments of the present disclosure will be described with reference to schematic views illustrating embodiments of the present disclosure. In the drawings, for example, due to manufacturing techniques and/or tolerances, modifications of the shape shown may be estimated. Thus, embodiments of the present disclosure should not be construed as being limited to the particular shapes of regions shown herein, for example, to include a change in shape results in manufacturing. The following embodiments may also be constituted by one or a combination thereof.

The contents of the present disclosure described below may have a variety of configurations and propose only a required configuration herein, but are not limited thereto.

Figure 2:
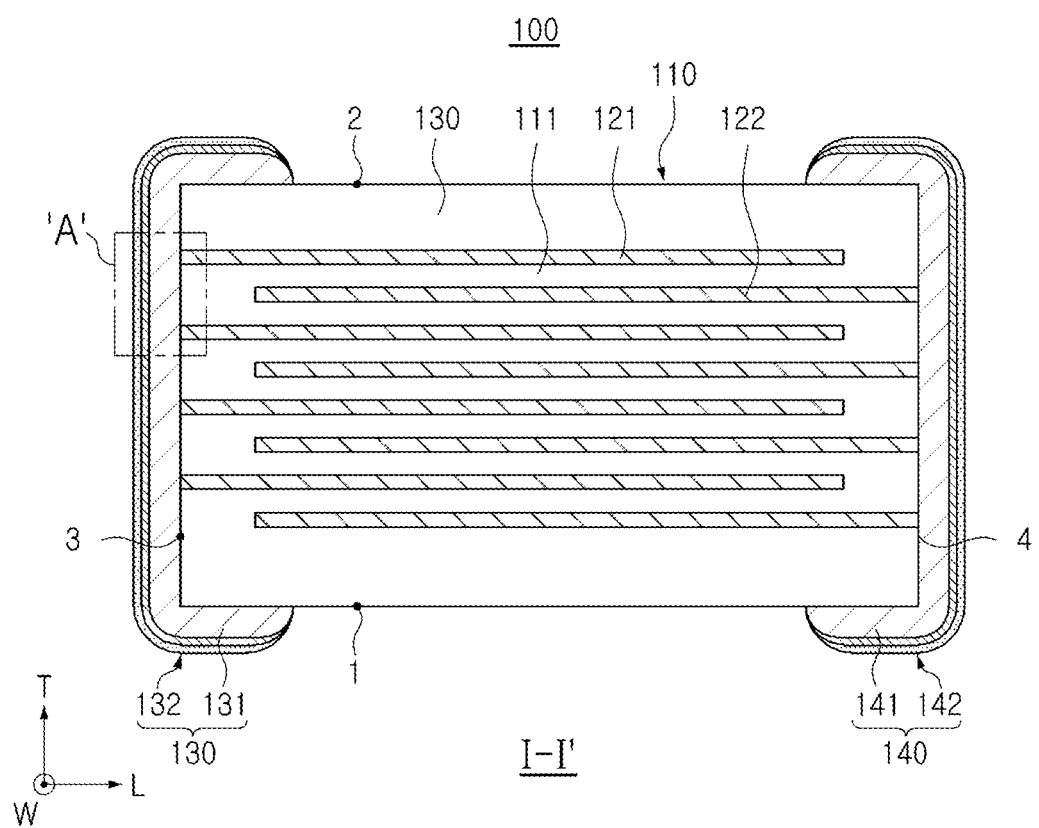
FIG. 2 is a cross-sectional view taken along line I-I' in FIG. 1.
Figure 3:
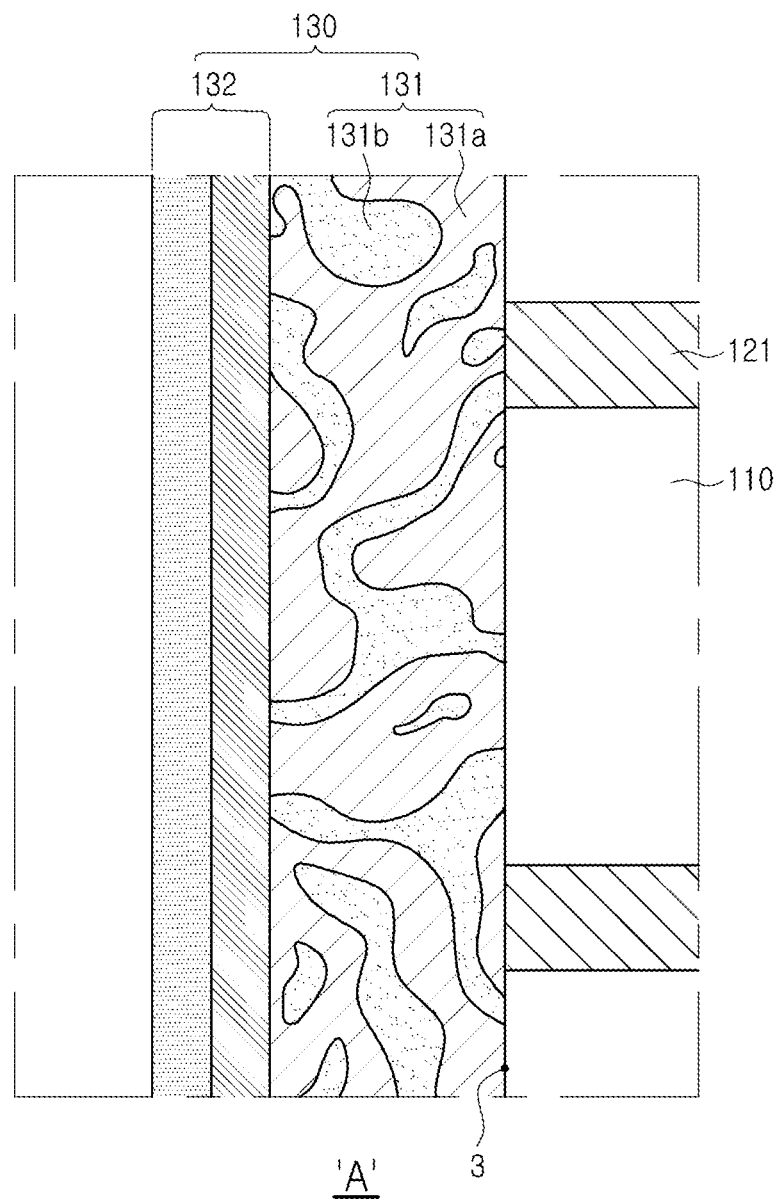
FIG. 3 is a schematic enlarged view of region "A" of FIG. 2.

FIG. 1 is a schematic perspective view of a capacitor component according to an exemplary embodiment. FIG. 2 is a cross-sectional view taken along line I-I' in FIG. 1. FIG. 3 is a schematic enlarged view of region "A" of FIG. 2.

Referring to FIGS. 1 to 3, a capacitor component 100 according to an exemplary embodiment may include a body 110 and first and second external electrodes 130 and 140.

The body 110 may include an active region, serving as a portion contributing to formation of capacitance of a capacitor, and upper and lower covers 112 and 113, respectively formed in upper and lower portions of the active region as upper and lower margin portions.

In an exemplary embodiment, the body 110 is not limited in shape, but may have a substantially hexahedral shape. For example, the body 110 may not have a perfect hexahedral shape, but may have a substantially hexahedral shape due to a difference in thickness depending on the disposition of internal electrode layers 121 and 122 and polishing of the a corner portion.

Directions of a hexahedron will be defined in order to clearly describe exemplary embodiments. Directions L, W, and T illustrated in the accompanying drawings refer to a length direction, a width direction, and a thickness direction, respectively. The thickness direction may be used to have the same concept as a lamination direction in which dielectric layers are laminated.

In the body 110, both surfaces opposing each other in the T direction are respectively defined as first and second surfaces 1 and 2, both surfaces connected to the first and second surfaces 1 and 2 and opposing each other in the L direction are respectively defined as third and fourth surfaces 3 and 4, and both surfaces connected to the first and second surfaces 1 and 2 as well as to the third and fourth surfaces 3 and 4 and opposing each other in the direction W are respectively defined as fifth and sixth surfaces 5 and 6. In this case, the first surface 1 may be a mounting surface.

The active region may have a structure in which a plurality of dielectric layers 111 and a plurality of first and second internal electrode layers 121 and 122 are alternately laminated with respective dielectric layers 111 interposed therebetween.

The dielectric layer 111 may be formed using high-k ceramic powder particles such as barium titanate ($BaTiO_3$)-based powder particles or strontium titanate ($SrTiO_3$)-based powder particles. However, a material of the dielectric layer 111 is not limited thereto. As an example, "the dielectric layer 1110 may be formed using barium titanate ($BaTiO_3$)-based powder particles" may mean that barium titanate ($BaTiO_3$)-based powder particles are used as a main component, and subcomponent powder particles are added to the main component to prepare and use a mixture thereof. The subcomponent may include a compound (referring to oxide, nitride, or the like) containing cations of an element in which a lattice location of barium (Ba) and/or titanium (Ti), for example, an A-site and/or a B-site, may be substituted or interstitial in the perovskite structure ($ABO_3$) of barium titanate ($BaTiO_3$).

A thickness of the dielectric layer 111 may be arbitrarily changed depending on a capacitance design of the capacitor component 100, and the first layer may be configured to have a thickness of 0.1 μm to 10 μm after a sintering process in consideration of a size and capacitance of the body 110. However, exemplary embodiments are not limited thereto. The thickness of the dielectric layer 111 may refer to an arithmetic mean value obtained by repeatedly measuring a dimension of a single dielectric layer 111 in the T direction, illustrated in an optical microscope image or a scanning electron microscope (SEM) image of a cross-section of the body 110 in the length and thickness directions (L-T) taken in a central portion in the direction W, a plurality of times in the L direction. Here, "measurement performed a plurality of times in the L direction" may refer to measurement performed at regular intervals in the L direction. Alternatively, the thickness of the dielectric layer 111 may refer to a value obtained by obtaining an arithmetic mean value of the above-mentioned numerical values in the T direction for each of a plurality of dielectric layers 111, illustrated in the above-mentioned image, and dividing a sum of the obtained values by the total number of the dielectric layers 111.

The first and second internal electrode layers 121 and 122 may be disposed to oppose each other with the dielectric layer 111 interposed therebetween.

The first and second internal electrode layers 121 and 122 may be formed by printing a conductive paste including a conductive metal, to have a predetermined thickness, on a dielectric green sheet for forming the dielectric layer 111, laminating conductive pastes with a dielectric green sheet interposed therebetween in a direction in which the dielectric green sheets are laminated, and sintering such a laminate. The first and second internal electrode layers 121 and 122 may be formed to be alternately exposed through the third and fourth surfaces 3 and 4 of the body 110 formed by sintering the laminate, and may be electrically insulated from each other by the dielectric layer 111 disposed therebetween.

The first and second internal electrode layers 121 and 122 may be electrically connected to the first and second external electrodes 130 and 140 through portions, alternately exposed through the third and fourth surfaces 3 and 4 of the main body 110, respectively.

Accordingly, when a voltage is applied to the first and second external electrodes 130 and 140, charges may be accumulated between the first and second internal electrode layers 121 and 122 opposing each other. In this case, the capacitance of the capacitor component 100 may be in proportion to an area of a region in which the first and second internal electrode layers 121 and 122 overlap each other.

The thickness of the first and second internal electrode layers 121 and 122 may be determined depending on use. For example, the thickness of the first and second internal electrode layers 121 and 122 may be determined within a range of 0.1 μm to 1.0 μm in consideration of a size and a use of the ceramic body 110, but exemplary embodiments are not limited thereto. As an example, the thickness of the first internal electrode layer 121 may be calculated by the same method as the above-described method of measuring the thickness of the dielectric layer 111.

The first and second internal electrode layers 121 and 122 may include nickel (Ni), copper (Cu), palladium (Pd), or alloys thereof, but exemplary embodiments are not limited thereto.

The upper and lower covers 112 and 113 may be formed of the same material as the dielectric layer 111 of the active region, except that they do not include an internal electrode layer. Alternatively, the covers 112 and 113 may be formed using ceramic dielectric powder particles, a material different from that of the dielectric layer 111. Here, "the covers 112 and 113 may be formed using ceramic dielectric powder particles, a material different from that of the dielectric layer 111" may mean that dielectric powder particles used to form the covers 112 and 113 and dielectric powder particles for forming the dielectric layer 111 include the same elements but ratios therebetween are different from each other, may mean that the types of elements of the above-mentioned subcomponents are different from each other, and may mean that contents of elements of the above-mentioned subcomponents are different from each other.

The upper and lower covers 112 and 113 may be considered to be formed by laminating a single dielectric layer, or two or more dielectric layers on the upper and lower surfaces of the active region in the T direction, and may basically serve to prevent damage, caused by physical or chemical stress, to the first and second internal electrode layers 121 and 122.

The external electrodes 130 and 140 may be disposed on the third and fourth surfaces 103 and 104 of the body 100 to be connected to the internal electrode layers 121 and 122. For example, the first external electrode 130 may be disposed on the third surface 103 of the body 110 to be connected to the first internal electrode layer 121 exposed to the third surface 103 of the body 110. The second external electrode 140 may be disposed on the fourth surface 104 of the body 110 to be connected to the second internal electrode layer 122 exposed to the fourth surface 104 of the body 110. The first and second external electrodes 130 and 140 may include first electrode layers 131 and 141 and second electrode layers 132 and 142 disposed on the first electrode layers 131 and 141, respectively. The first and second external electrodes 130 and 140 may be different only in terms of a connection relation to the internal electrode layers 121 and 122 and a formation location on the body 110. Therefore, hereinafter, the first external electrode 130 disposed on the third surface 103 of the body 110 will be mainly described for ease of description, and descriptions of the second external electrode 140 will be omitted. A description of the first external electrode 130 to be described later may be equally applied to the second external electrode 140.

The first electrode layer 131 may be in contact with and directly connected to the first internal electrode layer 121, exposed through the third surface 3 of the body 110, to secure electrical connection between the first external electrode 130 and the first internal electrode layers 121.

The first electrode layer 131 may include a conductive base 131a and a glass 131b disposed in the base 131a. For example, the first electrode layer 131 may be formed by applying a paste for an external electrode to the third surface 103 of the body 110 and sintering the applied paste.

The conductive base 131a, constituting a matrix of the first electrode layer 131, may include at least one of copper (Cu), silver (Ag), platinum (Pt), nickel (Ni), and tin (Sn). As an example, the conductive base 131a may include Cu, but exemplary embodiments are not limited thereto.

The glass 131b may be disposed in the conductive base 131a of the first electrode layer 131, and may be included to densify the first electrode layer 131. Due to the glass 131b, moisture resistance characteristics of the first electrode layer 131 may be improved. The glass 131b may contain 0.01 wt % or more to 10 wt % or less of nitrogen (N), in detail, 5.8 wt % or less of nitrogen (N) based on a total weight of the glass 131b. The moisture resistance characteristics (water vapor transmission rate) may be gradually increased until a weight ratio of nitrogen reaches 5.8 wt %, but may be saturated when the weight ratio of nitrogen is greater than 5.8 wt %.

The paste for an external electrode may include conductive powder particles, glass powder particles, and a binder. The conductive powder particles of the paste may be connected to each other during a paste sintering process to be the conductive base 131a of the first electrode layer 131. The glass powder particles of the paste may be connected to each other during the paste sintering process to be the glass 131b of the first electrode layer 131. A composition of the glass powder particles on a level of the paste and a composition of the glass on a level of the first electrode layer 131 are substantially the same, so that only a configuration of the glass powder particles applied to the paste will be described below.

The conductive powder particles of the paste may include at least one of Cu, Ag, Pt, Ni, and Sn. As a non-limiting example, the paste may include only Cu powder particles as conductive powder particles, or may include first conductive powder particles including Cu and second conductive powder particles including Ag as conductive powder particles, but exemplary embodiments are not limited thereto.

The glass powder particles of the paste may contain nitrogen (N). In the glass powder, nitrogen (N) may be bonded to silicon (Si). Nitrogen (N) replaces oxygen (≡Si—O≡Si) in a glass matrix with nitrogen [(≡Si)3≡N]. As two-coordinate oxygen (O) is replaced with three-coordinate nitrogen (N), crosslinking density of the glass matrix may be increased, and a glass network may be further strengthened by covalent bonding of an oxynitride structure. As a glass mesh structure is strengthened, a free volume of the glass mesh may be decreased, so that ion exchange caused by moisture and a plating solution may be suppressed to prevent glass leaching. Accordingly, chemical properties such as water resistance/acid resistance/alkali resistance may be significantly improved. As an example, the content of nitrogen (N) in the glass powder particles may be 0.01 wt % or more to 10 wt % or less, in detail, 5.8 wt % or less. When the content is less than 0.01 wt %, the moisture resistance characteristics of the first electrode layer 131 may be deteriorated. When the content is greater than 5.8 wt %, the moisture resistance characteristics of the first electrode layer 131 may be guaranteed, but may be saturated and an increase in the effect may be insignificant.

The glass powder particles of the paste may further include at least one selected from the group consisting of tin (Sn), iron (Fe), nickel (Ni), and yttrium (Y). As a non-limiting example, the glass powder particles may include at least one of tin (Sn), iron (Fe), and nickel (Ni) in an amount of 4.5 wt % or less. As an example, the glass powder particles may further include at least one oxide selected from the group consisting of tin (Sn), iron (Fe), nickel (Ni), and yttrium (Y). As a non-limiting example, the glass powder particles may include at least one of $SnO_2$, $Fe_2O_3$, and NiO. $SnO_2$, $Fe_2O_3$, and NiO may improve wettability between the conductive base 131a and the glass 131b in the first electrode layer 131. Thus, density of the external electrode 131 may be increased to improve moisture resistance characteristics. In the glass powder particles, at least one of SnO2, $Fe_2O_3$ and NiO may be contained in an amount of 7 wt % or less. When the content of at least one of $SnO_2$, $Fe_2O_3$, and NiO is greater than 7 wt %, crystallization of the glass may be performed during a paste sintering process to reduce a densification effect resulting from the glass 131b.

The glass powder particles of the paste may further include 5 wt % or more to 55 wt % or less of $SiO_2$, 10 wt % or more to 50 wt % or less of BaO, 10 wt % or more to 25 wt % or less of alkali metal oxide, 1 wt % or more to 10 wt % % of CaO, 5 wt % or more to 25 wt % or less of $B_2O_3$, 1 wt % or more to 25 wt % or less of $Al_2O_3$, and 1 wt % or more to 20 wt % or less of ZnO. As a content of $SiO_2$ is increased, a melting point may be increased due to the strengthening of glass matrix bond and viscosity may be increased. BaO, alkali metal oxide, and CaO are basic oxides, and, as the contents thereof are increased, a glass melting point may be decreased and non-crosslinking oxygen in the matrix may be increased to improve glass fluidity. As the content of $B_2O_3$ is increased, a melting point may be decreased and a vitrification tendency may be improved, but the glass powder particles of the paste may be vulnerable to glass leaching caused by the plating solution. As the content of $Al_2O_3$ is increased, $Al_2O_3$ may serve to increase corrosion resistance and to strengthen a glass structure but may cause crystallization to be facilitated. ZnO may act as an amphoteric oxide and may serve to suppress nucleation.

As an example, the glass powder particles may be prepared by chemically bonding a) 5 wt % or more to 55 wt % or less of $SiO_2$, b) 10 wt % or more to 50 wt % or less of BaO, c) 10 wt % or more to 25 wt % or less of an alkali metal oxide, d) 1 wt % or more to 10 wt % or less of CaO, e) 5 wt % or more to 25 wt % or less of $B_2O_3$, f) 1 wt % or more to 25 wt % or less $Al_2O_3$, g) 1 wt % or more to 20 wt % or less of ZnO, h) 0.1 wt % or more to 10 wt % or less of nitride, and i) 7 wt % or less of at least one oxide selected from the group consisting of tin (Sn), iron (Fe), nickel (Ni), and yttrium (Y).

Table 1 illustrates a result obtained by measuring moisture resistance characteristics while changing the weight ratio of nitrogen (N) in the glass powder particles.

The moisture resistance characteristics were quantified as a water vapor transmission rate (mg/m·day) of a first electrode layer in which an external electrode paste is sintered. Using a thickness (e.g., 10 μm) of the sintered layer, a water vapor transmission rate (mg/m·day) is measured using a moisture transmission measuring device. The content of nitrogen (N) was substantially the same as the content of nitrogen in glass powder particles on a level of the paste and the content of nitrogen in glass on a level of the first electrode layer.

TABLE 1

| | Content of Nitride (wt %) | Content of Nitrogen (wt %) | WVTR (mg/m · day) |
|---|---|---|---|
| #1 | 0 | 0 | 0.028 |
| #2 | 2 | 0.6 | 0.015 |
| #3 | 4 | 1.1 | 0.007 |
| #4 | 6 | 2.5 | 0.007 |
| #5 | 10 | 5.8 | 0.004 |
| #6 | 15 | 5.8 | 0.004 |

WVTR = Water Vapor Transmission Rate

As can be seen in Table 1, as the content of nitrogen in glass is increased, moisture resistance characteristics are increased. When glass powder particles are prepared, as the content of nitride is increased, the content of dissolved nitrogen in the glass powder particles is increased. However, as illustrated in Examples 5 and 6, the content of nitrogen in glass powder particles is considered to have an upper limit of 5.8 wt % even when the content of nitride is increased. Accordingly, it can be seen that moisture resistance characteristics are improved when the content nitrogen in the glass and glass powder particles is 0.01 wt % or more to 5.8 wt % or less.

The second electrode layer 132 may be disposed on the first electrode layer 131. The second electrode layer 132 may be in contact with each of the conductive base 131a and the glass 131b of the first electrode layer 131. As a non-limiting example, the second electrode layer 132 may be a plating layer formed by electroplating. The second electrode layer 132 may have, for example, a structure in which a nickel plating layer and a tin plating layer are sequentially laminated. The nickel plating layer may be in contact with each of the conductive base 131a and the glass 131b of the first electrode layer 131. As a result, the first and second electrode layers 131 and 132 may be physically and electrically connected to each other.

The first external electrode 130 may include a connection portion, formed on the third surface 3 of the body 110, and a band portion extending from the connection portion to at least a portion of each of the first surface 1, the second surface 2, the fifth surface 105, and the sixth surface 6 of the body 110. However, example embodiments are not limited to the above description, and a shape of the first external electrode 130 may be modified into various shapes such as an "L" shape, a "C" shape, and the like.

In the above description, as an example, the presence and a weight ratio (wt %) of nitrogen (N) in the glass 131b may be obtained by performing EDS mapping on the glass 131b in a total of nine regions, including three regions of the connection portion and three regions of each band portion of the first electrode layer 131 illustrated in the image, based on an SEM image for a length direction-width direction (L-W) cross-section taken in a central portion of the capacitor component 1 in the thickness T direction and calculating an arithmetical average thereof. The nine regions may be regular intervals, but example embodiments are not limited thereto. The description may be equally used to prove the presence and weight ratio (wt %) of tin (Sn), iron (Fe), nickel (Ni), and yttrium (Y) in the above-mentioned glass 131b. A total weight of the glass may obtained by EDS mapping silicon (Si), oxygen (O), alkali metal (e.g., sodium [Na], potassium [K]), aluminum (Al), calcium (Ca), barium (Ba), zinc (Zn), nitrogen (N), tin (Sn), iron (Fe), nickel (Ni), and yttrium (Y) for each region, and a total weight of glass including the respective wt % of the mapped elements may add to 100%.

The presence and weight ratio (wt %) of nitrogen (N) and other elements in the glass powder particles may be obtained by, for example, performing SEM-EDS mapping on the glass powder particles in a total of nine regions and calculating an arithmetical average weight ratio for each element. A total weight of the glass powder particles may obtained by EDS mapping silicon (Si), oxygen (O), alkali metal (e.g., sodium [Na], potassium [K]), aluminum (Al), calcium (Ca), barium (Ba), zinc (Zn), nitrogen (N), tin (Sn), iron (Fe), nickel (Ni), and yttrium (Y) for each region, and a total weight of glass including the respective wt % of the mapped elements may add to 100%.

As described above, according to exemplary embodiments, moisture resistance characteristics may be improved through glass matrix reinforcement of an external electrode While exemplary embodiments have been shown and described above, it will be apparent to those skilled in the art that modifications and variations could be made without departing from the scope of the present disclosure as defined by the appended claims.

What is claimed is:

1. A capacitor component comprising:
   a body including a dielectric layer and an internal electrode layer; and
   an external electrode disposed on one surface of the body, wherein:
   the external electrode includes a conductive base and a glass disposed in the conductive base; and
   the glass includes 0.01 wt % or more to 5.8 wt % or less of nitrogen (N) based on a total weight of the glass.

2. The capacitor component of claim 1, wherein:
   the glass further includes at least one selected from the group consisting of tin (Sn), iron (Fe), nickel (Ni), and yttrium (Y).

3. The capacitor component of claim 2, wherein:
   the at least one selected from the group consisting of tin (Sn), iron (Fe), nickel (Ni), and yttrium (Y) is contained in an amount of 4.5 wt % or less based on the total weight of the glass.

4. The capacitor component of claim 3, wherein:
   the conductive base includes at least one of copper (Cu), silver (Ag), platinum (Pt), nickel (Ni), and tin (Sn).

5. The capacitor component of claim 1, wherein:
   the external electrode includes a first electrode layer, including the conductive base and a glass disposed in the conductive base, and a second electrode layer disposed on the first electrode layer.

6. The capacitor component of claim 1, wherein the glass further includes tin (Sn).

7. A paste for an external electrode, the paste comprising:
   conductive powder particles, glass powder particles, and a binder, wherein:
   the glass powder particles include 0.01 wt % or more to 5.8 wt % or less of nitrogen (N) based on a total weight of the glass powder particles.

8. The paste of claim 7, wherein:
   the glass powder particles further include at least one oxide selected from the group consisting of tin (Sn), iron (Fe), nickel (Ni), and yttrium (Y).

9. The paste of claim 8, wherein the glass powder particles includes 7 wt % or less of at least one of $SnO_2$, $Fe_2O_3$, and NiO.

10. The paste of claim 9, wherein:
    the conductive powder particles includes at least one of copper (Cu), silver (Ag), platinum (Pt), nickel (Ni), and tin (Sn).

11. The paste of claim 9, wherein:
    the glass powder particles further includes 5 wt % or more to 55 wt % or less of $SiO_2$, 10 wt % or more to 50 wt % or less of BaO, 10 wt % or more to 25 wt % or less of alkali metal oxide, 1 wt % or more to 10 wt % % of CaO, 5 wt % or more to 25 wt % or less of $B_2O_3$, 1 wt % or more to 25 wt % or less of $Al_2O_3$, and 1 wt % or more to 20 wt % or less of ZnO.

12. The paste of claim 8, wherein the glass powder particles further include an oxide of tin (Sn).

13. The paste of claim 7, wherein the glass powder particles include 0.6 wt % or more to 5.8 wt % or less of nitrogen (N) based on a total weight of the glass powder particles.

14. A method for producing an external electrode of a capacitor component, the method comprising:
    applying the paste of claim 7 to a surface of a body of the capacitor component; and
    sintering the applied paste.

15. A capacitor component comprising:
    a body including a dielectric layer and an internal electrode layer; and
    an external electrode disposed on one surface of the body, wherein:
    the external electrode includes a conductive base and a glass disposed in the conductive base; and
    the glass includes 0.6 wt % or more to 5.8 wt % or less of nitrogen (N) based on a total weight of the glass.

16. The capacitor component of claim 15, wherein:
    the glass further includes at least one selected from the group consisting of tin (Sn), iron (Fe), nickel (Ni), and yttrium (Y).

17. The capacitor component of claim 16, wherein the glass further includes tin (Sn).

18. The capacitor component of claim 16, wherein:
    the at least one selected from the group consisting of tin (Sn), iron (Fe), nickel (Ni), and yttrium (Y) is contained in an amount of 4.5 wt % or less based on the total weight of the glass.

19. The capacitor component of claim 15, wherein:
    the conductive base includes at least one of copper (Cu), silver (Ag), platinum (Pt), nickel (Ni), and tin (Sn).

20. The capacitor component of claim 15, wherein:
    the external electrode includes a first electrode layer, including the conductive base and a glass disposed in the conductive base, and a second electrode layer disposed on the first electrode layer.

* * * * *